Figure 1:
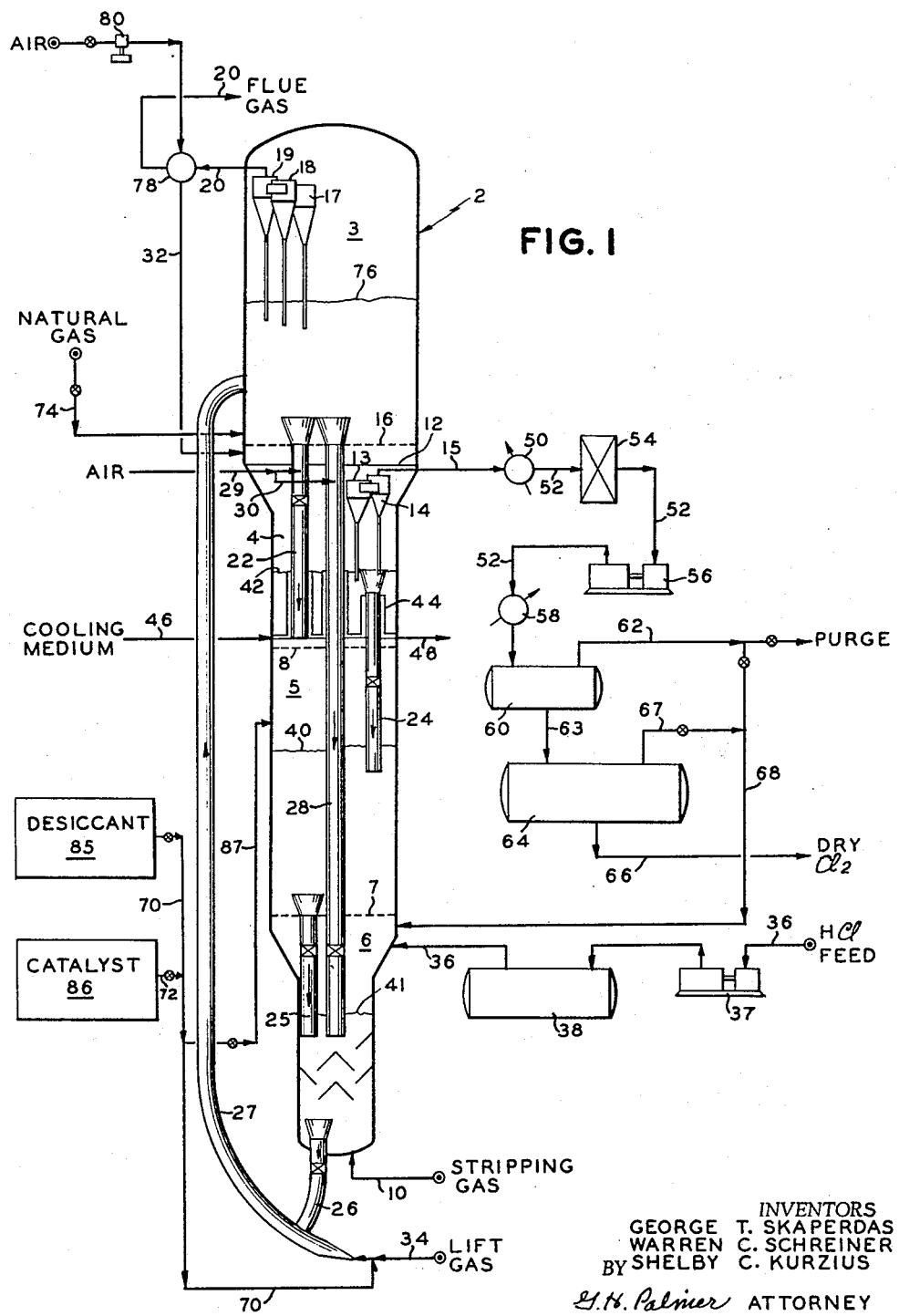

Dec. 1, 1964

G. T. SKAPERDAS ETAL 3,159,455

PROCESS FOR THE CATALYTIC PRODUCTION OF HALOGEN
UNDER FLUIDIZED REACTION CONDITIONS

Filed Aug. 2, 1961

2 Sheets-Sheet 1

INVENTORS
GEORGE T. SKAPERDAS
WARREN C. SCHREINER
BY SHELBY C. KURZIUS

*G.H. Palmer* ATTORNEY

*M.J. Maue* AGENT

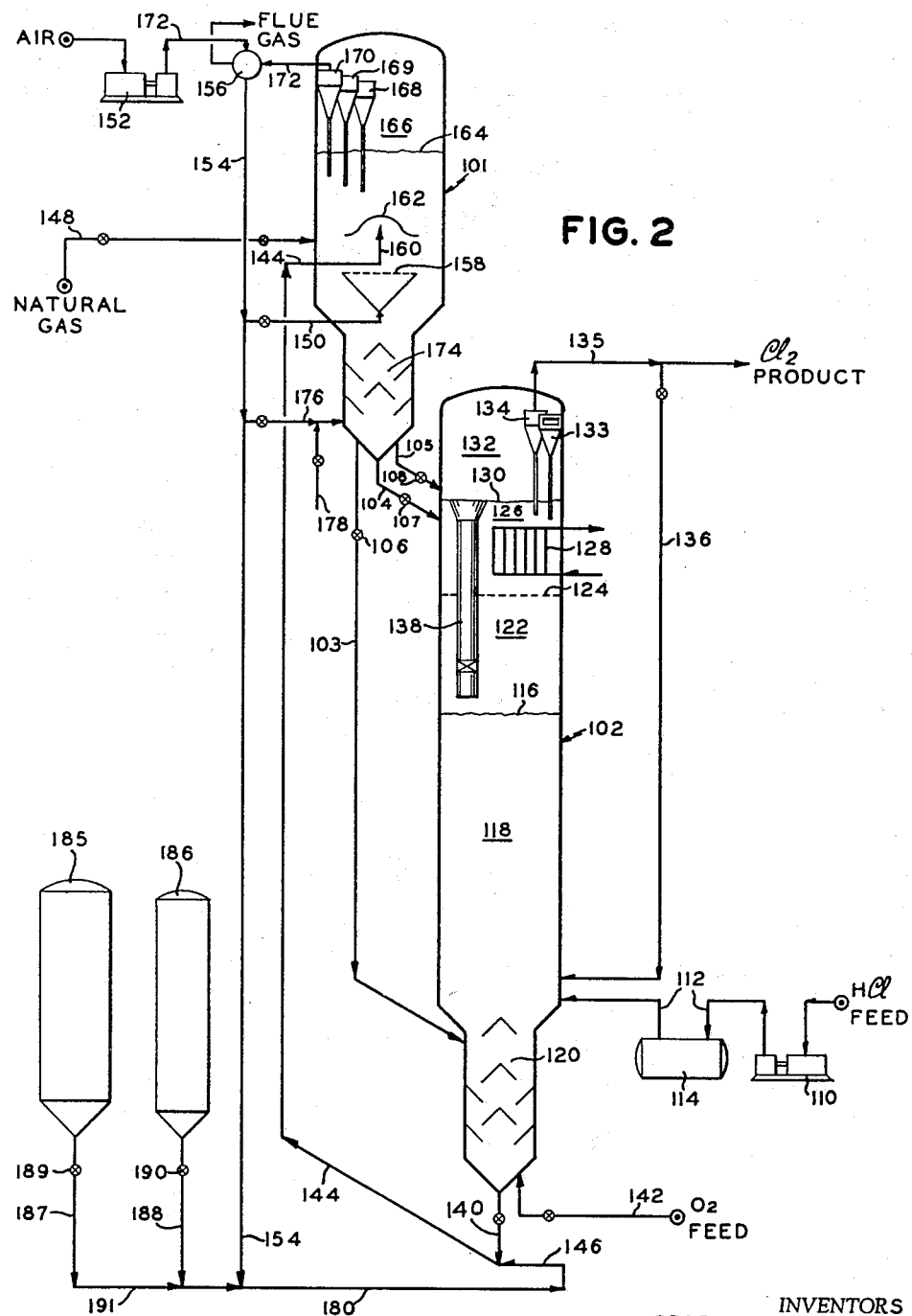

United States Patent Office 3,159,455
Patented Dec. 1, 1964

3,159,455
PROCESS FOR THE CATALYTIC PRODUCTION OF HALOGEN UNDER FLUIDIZED REACTION CONDITIONS
George T. Skaperdas, Fresh Meadows, and Warren C. Schreiner, East Norwich, N.Y., and Shelby C. Kurzius, Princeton, N.J., assignors, by mesne assignments, to Pullman Incorporated, a corporation of Delaware
Filed Aug. 2, 1961, Ser. No. 128,861
12 Claims. (Cl. 23—216)

This invention relates to a process and apparatus for effecting fluidized catalytic reactions involving a halogen ion. In one aspect, the invention is directed to a continuous process for the halogenation of hydrocarbons in the presence of a fluidized mixture of desiccant and catalyst and the regeneration of solids. In another aspect, the invention is directed to the continuous conversion of a hydrogen halide to halogen in the presence of a fluidized mixture of desiccant and catalyst and the regeneration of the mixture.

The basic reaction of the process relates to the conversion of a hydrogen halide to a halogen as represented by the equation:

$$4HX + O_2 \rightarrow 2X_2 + 2H_2O$$
(Oxidizing agent)

wherein X is a halogen ion and wherein the oxidizing agent is any of those disclosed in Serial No. 837,364, filed Sept. 1, 1959, now U.S. Patent 3,114,607, issued Dec. 17, 1963; although the process of this invention is especially applicable to the production of chlorine as represented in the following equation:

$$4HCl + O_2 \rightarrow 2Cl_2 + 2H_2O$$

When a hydrocarbon is present in the reaction mixture, the process of this invention and the advantages thereof are applied to the halogenation of the hydrocarbon. The hydrocarbon employed can be any of the olefinic, paraffinic and/or aromatic types. Representative of these types of reactions are the following hydrocarbon reactions; although generally, halogenation of $C_1$ to $C_6$ hydrocarbons is well known and also within the scope of this invention as are the higher molecular weight hydrocarbons·

$$C_2H_6 + Cl_2 \xrightarrow[O_2-HCl]{} \tfrac{1}{2}C_2H_4Cl_2 + \tfrac{1}{2}C_2H_5Cl + H_2O$$

$$C_2H_4 + Cl_2 \xrightarrow[O_2-4HCl]{} C_2H_4Cl_2 + 2H_2O + 2Cl_2$$

$$C_2H_2 + Cl_2 \xrightarrow[O_2-4HCl]{} C_2H_2Cl_2 + 2H_2O + 2Cl_2$$

$$C_6H_6 + Cl_2 \xrightarrow[O_2-4HCl]{} C_6H_5Cl + 2H_2O + 2Cl_2$$

$O_2$ in the above equations represents the oxidizing agent and is not necessarily molecular oxygen.

Heretofore, this process has usually been carried out by passing a mixture of the gaseous reactants and oxidizing agent through a reaction chamber containing a stationary or fixed bed of catalyst consisting of copper chloride in the absence of a disiccant. When thus performed, numerous difficulties arise in the process in connection with such factors as temperature control due to the highly exothermic character of the reaction, the high temperatures necessary to secure a desired rate of reaction, the tendency of the catalysts to volatilize at the high temperature with their subsequent loss from the system, and the separation of the halogen product in satisfactory yield and purity from the reaction products.

The application of other fluidized processes employed in hydroforming and other types of reactions have also proven unsatisfactory for the extremely corrosive nature of the halogen process is not taken into account. The entrainment of product with the fluidized solids and the volatilization of the halogenation catalyst are other serious difficulties which are inherent in fluidized processes of the art.

Thus, it is the purpose of the present invention to provide a process involving the release of a halogen ion from a halogen-containing compound wherein these defects and disadvantages are eliminated.

Another object of this invention is to provide a continuous and economically feasible method for the production of dry halogen from hydrogen halide.

Another object of this invention is to provide a continuous process for the halogenation of hydrocarbons.

Another object of this invention is to provide a continuous, catalytic process for the production of dry chlorine from hydrogen chloride in the presence of a desiccant whereby the separation of chlorine is greatly simplified.

Still another object is to provide a continuous catalytic process for the chlorination of hydrocarbons in the presence of a desiccant whereby the separation of chlorinated product is greatly simplified.

These and other objects will become apparent to those skilled in the art from the accompanying description and disclosure.

The following discussion will be mainly directed to the conversion of a hydrogen halide to halogen since this is the basic reaction of the invention; although it is to be understood that hydrocarbons can be included in the reaction mixture, if desired, to produce the corresponding halogenated products and that compounds capable of yielding halogen can be substituted totally or in part for the hydrogen halide. Such compounds include nitrosyl halides and ammonium halides of which the chlorides and bromides are preferred.

Generally, in regard to the production of halogen, for example, in the production of chlorine, the basic steps of this process comprise contacting the reactant vapors with a desiccant and a Deacon catalyst or any of the catalysts described in copending application Serial No. 837,364 or mixtures of these catalytic materials. The desiccant and catalyst, which are the solids in the process, are fluidized in the reaction zone wherein the hydrogen halide (hydrogen chloride) is converted to halogen (chlorine) and water in the vapor phase. The desiccant absorbs the water as it is formed by the reaction and thus drives the reaction to completion. The gaseous reactor effluent is passed from the reaction zone to an adjacent cooling and drying zone containing a comparatively dry mixture of fluidized solids wherein the vapors are cooled at least 50° below the reaction temperature in order to condense any vaporized catalyst and water vapor not absorbed by the desiccant in the reaction zone. The water and condensed catalyst, if present, is then absorbed by the solids in the cooling zone and any solids entrained with the effluent gas are removed by convenient means such as by means of cyclones. The dry product gas is then withdrawn from the contacting vessel.

In the reaction zone, because water is produced at a considerable rate and because the reaction temperature is high, the vapor pressure while low, is nevertheless measurable so that complete removal of moisture from the reaction effluent is generally not accomplished in this zone before the desiccant is exhausted. However, the vaporous effluent from the reaction zone, upon passing to the cooling zone experiences a reduction in temperature. This effluent, low in moisture content then contacts fresh, dry desiccant at the lower temperature in the cooling zone which is free of water formation and the desiccant completely removes the last traces of water before the effluent is withdrawn from the cooling zone and passes to subsequent stages of refinement.

The fluidized solid after absorbing substantial quantities of water is continuously removed from the reaction zone and stripped of any entrained product and/or reactant, at a temperature at least as high as the reaction temperature, in an adjacent stripping zone with an oxidation gas. The solids thus stripped are then passed to regeneration where at a still higher temperature, the solids are dried in the presence of combustion gases. Fluidizing conditions are preferably maintained in the various zones and the resulting flue gases are separated from the regenerated solids before their withdrawal from the regenerator, preferably by means of cyclones.

The regenerated solids are then passed to a cooling zone in which the temperature of the solids is lowered at least 50° below the reaction temperature to condition the solids for recycle to the reaction zone. When air is used as a combustion gas in the regenerator, inerts such as, for example, nitrogen, carbon dioxide, etc., may be entrained with the regenerated solid material, in which case, it is preferable to strip the inerts from the solids before their introduction into the reaction zone. The same stripping gas used in the reactor-stripper, e.g., oxygen, can be used in this regenerator-stripper and the gas is preferably passed counter-current to the regenerated solids.

Methods for purifying the chlorine gas removed from the contacting vessel are generally known. For example, the chlorine can be removed from contaminating substances by a series of absorption and desorption steps with hydrogen chloride as the absorption medium. In fact, any of the methods previously described can be applied to the present invention. A convenient and economical method involves withdrawing product effluent from the vessel, subjecting the dried mixture to single, or a series of alternate compressing and cooling steps until the mixture is under a pressure of from about 300 p.s.i.g. to about 500 p.s.i.g. where, at a temperature below 150° F., chlorine is condensed, and withdrawing a purge stream to remove any contaminant gases if present, for example nitrogen, oxygen and unconverted hydrogen chloride which are usually present in an amount less than about 1 percent, when air is the oxidizing agent. The condensate is then recovered as pure dry chlorine product. If desired, a portion of the gaseous effluent from the contacting vessel which contains a considerable amount of oxygen can be recycled to the reaction zone for the beneficial purpose of maintaining a high partial pressure of oxygen therein, and preventing degradation of the catalyst.

Since the present process involves the circulation of corrosive mixtures wherever hydrogen chloride and water are present, it is recommended as a safety factor that corrosive-resistant equipment be employed even though the desiccant absorbs substantially all of the water. For example, the internals of the regenerator and stripping sections can be 4-6 chromium steel alloy. Stainless steel can be employed in the cooler and Inconel is preferably used in the reactor. The entire reaction vessel is most desirably brick lined carbon steel shell which may or may not include a lead barrier between the brick lining and the shell.

A clearer understanding of the present invention will be had from the description of the accompanying drawing; however, it is to be understood that the specific embodiments shown in the drawings should not, in any way, limit the scope of this invention. Reference is now had to FIGURE 1 which illustrates a particular embodiment of the present process in an apparatus especially designed for contacting fluidized solids with a highly corrosive gaseous mixture. In order to simplify the following discussion, the hydrogen halide conversion process shown in FIGURE 1 will be discussed in reference to the production of a particular halogen, namely chlorine.

In the drawing, the reaction or contacting vessel 2 is divided into four chambers, namely, a top regeneration chamber 3, an adjacent lower cooling and drying chamber 4, reaction chamber 5 located below the cooling and drying chamber and stripping chamber 6 located below the reaction chamber in the lowermost portion of the vessel. The top of the cooling chamber is sealed from the regeneration chamber by impervious plate 12. Chamber 6 is separated from chamber 5 and chamber 5 is separated from chamber 4 by acid-resistant pervious plates or grids 7 and 8 respectively, which allow upward passage of gaseous materials therethrough. Grid 9 is positioned in the lowermost portion of the stripping chamber at a point slightly above the bottom of the vessel and stripping gas is introduced into the bottom of the vessel from line 10 in the free space below grid 9. Generally, the flow of gaseous materials in the vessel is in an upward direction through grids 9, 7 and 8 and of sufficient velocity to maintain solid materials in each of these chambers in a fluidized state. In chamber 4, the gaseous materials pass into separators 13 and 14 and are then withdrawn from the vessel by means of line 15. Grid 16 is positioned in the lower portion of the regeneration chamber slightly above plate 12 and regeneration gas in line 32 is introduced below grid 16 in the free space above plate 12 for upward flow through the regenerator at sufficient velocity to maintain solids therein in a fluidized state. The regeneration gaseous effluent is then passed through separators 17, 18 and 19 respectively and withdrawn from the vessel by means of line 20. In the process of this invention, the separators are preferably cyclone separators as shown in FIGURE 1, however, it is to be understood that more or fewer cyclones can be used in each chamber and that either or both of the chambers can be equipped with external cyclones having diplegs terminating inside the vessel, if desired.

Interconnecting chambers 3 and 4, 4 and 5, 5 and 6 and 3 and 6 are valved standpipes 22, 24, 25 and 28 respectively. A valved withdrawal standpipe 26 is situated in the lower portion of chamber 6 and is adapted to withdraw solids in a downwardly direction for delivery to external transfer line 27 which connects the lower portion of standpipe 26 with the lower portion of chamber 3 above grid 16. As stated above, valved standpipe 28 interconnects chamber 3 with chamber 6 for the purpose of maintaining the temperature in chamber 6 by direct heat exchange with the solids from the regenerator, however it is to be understood that standpipe 28 and the passage of solids from the regenerator to chamber 6 can be omitted and the temperature maintained in chamber 6 by other means, e.g., by controlling the temperature of the stripping gas feed with an external heater.

Generally, the flow of solid materials between chambers in vessel 2 is in a downward direction from regeneration chamber 3 to chambers 4 and 6 through standpipes 22 and 28 respectively; from chamber 4 downwardly into chamber 5 through standpipe 24; from chamber 5 downwardly into chamber 6 by means of standpipe 25 and from chamber 6 downwardly to transfer line 27 by means of withdrawal standpipe 26. In each of the chambers, the solids are fluidized in an upwardly direction by gaseous reactants. If desired, the catalyst in standpipes 22 and 28 can be conditioned by the introduction of gaseous material, e.g., air or oxygen, from lines 29 and 30 into standpipes 22 and 28 respectively.

In transfer line 27, the solid materials are contacted with an upwardly flowing lift gas from line 34 which transfers the solids upwardly into chamber 3. The gas used to transfer solids upwardly in line 27 can be any gaseous material which does not degrade the catalyst or interfere with the halogen reaction. Examples of suitable gases include air, oxygen, oxygen-enriched air, methane, steam and mixtures thereof. A mixture of fresh desiccant from hopper 85 and fresh catalyst from hopper 86 is also passed to transfer conduit 27 by means of lines 72 and 70. This addition of fresh solids at least partially compensates for any solids lost from the system through attrition and/or deactivation of the catalyst. Valved line 87 also serves this purpose, but delivers the fresh solid mixture directly to the reaction chamber 5. Line 87 is also used at startup to introduce the solids in the proper mixture into the reaction zone. The fresh solid can be introduced continuously or intermittently during the operation of the process. Generally, less than 2 percent of the solid mixture is replaced in this way.

In operation, a desiccant material, e.g., acid-activated montmorillonite, is mixed with a suitable catalyst, e.g., chromium sesquioxide in a weight percent between about 50 and about 99.9 per weight of metal in the catalyst, for example, about 70 percent by weight. The solid mixture is introduced into reaction zone 5 wherein the solids are contacted with an oxidizing gas, e.g., oxygen, entering zone 5 from lower stripping zone 6 and gaseous hydrogen chloride which is introduced into the system by means of line 36 after compression in compressor 37, and passing through surge drum 38. An excess of oxidizing agent with respect to hydrogen halide between about 10:1 and about a 1:1 mol ratio is generally employed in the reaction zone. For example, in this operation a 40 percent excess of oxygen was used in the combined feed to reaction zone 5 in order to maintain a high partial pressure of oxygen and catalyst activity in the reaction zone. This was accomplished by recycling a portion of the product effluent as hereinafter described. The reaction zone in the production of halogen is operated at a temperature of between about 600° F. and about 1000° F. under from about 0 p.s.i.g. to about 160 p.s.i.g. with a space velocity of from about 150 cc. to about 600 cc. total gas per hour per gram of catalyst. In this particular example, the reaction zone was operated at about 850° F. under 55 p.s.i.g. with a space velocity of about 400 cc. total gas, under which conditions hydrogen chloride was oxidized to chlorine and water. However, it is to be understood that in a process for the halogenation of a hydrocarbon, temperatures are usually lower, i.e., between about 500° F. and about 625° F. for olefins such as ethylene, propylene, butylene, butadiene, isoprene, etc.; between about 550° F. and about 750° F. for paraffins such as methane, ethane, propane, butane, hexane, etc., and between about 300° F. and about 650° F. for aromatics such as benzene, phenol, naphthylene, toluene, xylene, etc. Examples of other hydrocarbons which can be used in the present process are listed in copending application Serial No. 128,859, filed August 2, 1961.

In the presence of the desiccant, the water is absorbed to drive the reaction to completion, i.e., to produce at least a 90 percent conversion of the hydrogen chloride per pass, which in this particular operation, was a 95 percent conversion of hydrogen chloride. Other processes of the art which fail to remove water in the reaction zone are limited by a 70 percent thermodynamic equilibrium. In this embodiment, at 30 mm./Hg partial pressure of water vapor in the reaction zone, the equilibrium water content of the clay is about 2.1 weight percent although the clay can be employed until the saturation limit is reached. The weight ratio of clay to water in the production of halogen in the process of the present invention is between about 50:1 and about 150:1, preferably between about 60:1 and about 80:1. In this particular example, a stoichiometric ratio of clay with water produced by the process was used.

The preferred desiccant materials employed in this process are those recited in copending application Serial No. 837,364, now U.S. Patent 3,114,607, issued December 17, 1963, i.e., montmorillonite, bentonite, beidellite, nontronite, hectorite, saponite and sauconite. However, other desiccants such as alumina, silica, talc, fuller's earth, calcium sulfate, etc., can be used if desired.

The solids in reaction zone 5 are fluidized to a bed level indicated by 40 leaving a space above the bed level for disengagement of the gaseous effluent from the solid materials. During the reaction, some of the catalyst may volatilize, particularly in cases where a copper chloride catalyst is used, because of the high temperatures maintained in this zone. The vaporized catalyst, if present, then forms part of the gaseous effluent leaving the reaction zone.

The reactor effluent gases pass upwardly through grid 8 into a second bed of catalyst-desiccant material which is maintained in fluidized condition by the upward flow of these gases to bed level 42, allowing space above 42 for disengagement of solids and gases. In cooling zone 4, the temperature of the gaseous material is lowered at least 50° F. (in this operation about 250° F.), by means of direct contact with solids therein and indirect heat exchange with cooling media in cooling coil 44 which contains a cooling medium entering the coil from line 46 and being withdrawn from the coil by means of line 48. The cooling medium may be any of a number of suitable materials, such as, for example water, petroleum oils, chlorinated biphenyl and terphenyl compounds, ethylene glycol, a enethetic mixture of diphenyl and diphenyl oxide and the like. These materials are particularly well suited to the halogen production process, however, it is to be understood, that, since the halogenation of hydrocarbons generally can be effected at lower temperatures, in an operation of this type the cooling zone is maintained at a correspondingly lower temperature and, lower boiling fluids can be used as the cooling media, for example, naphthalene, decanol, decyl amine, etc. In cooling zone 4, the gaseous reactant effluent is contacted with a regenerated desiccant and catalyst mixture so that any water and/or catalyst condensed at the lower temperature is immediately absorbed and/or deposited on the surface of the solids therein. The product gas mixture then passes into cyclone separators 13 and 14 wherein any remaining solids entrained with the gaseous materials are separated and returned to the solid mixture in the cooling zone. The anhydrous product effluent is then passed by means of line 15 into cooler 50 wherein this particular effluent containing a mixture mainly of chlorine and oxygen with small amounts of nitrogen and unconverted hydrogen chloride, is cooled to a temperature between about 75° F. and about 400° F., preferably between about 90° F. and about 125° F. In this example, the temperature on the product effluent was lowered to about 100° F. The resultant material is then passed through line 52 through filter 54 and into compressor 56 wherein the pressure of the material is raised to effect condensation of chlorine at 100° F. In this instance, the pressure is raised from about 48 p.s.i.g. to about 83 p.s.i.g. with the corresponding rise in temperature to about 160° F. The material is removed from the compressor and totally condensed in condenser 58, in this instance, at a temperature of about 100° F., and then passed to chlorine separator 60 by means of line 52. A vaporous purge stream is removed from the system by means of line 62 while the remaining liquid chlorine is passed to storage drum 64 by means of line 63. The dry liquid chlorine product is recovered from drum 64 by means of line 66. A portion of the chlorine product effluent and purge is recycled to vessel 2 below grid 7 by means of valved lines 67 and 68, to recover the oxygen in the product mixture and to maintain the oxygen excess in the reaction zone.

The solid mixture of desiccant and catalyst is introduced from cooling zone 4 through valved standpipe 24 to maintain the temperature in the reaction zone wherein the exothermic reaction takes place and to replenish the spent solid mixture withdrawn. The wet desiccant material is withdrawn from reaction zone 5 from a point above grid 7 and passed to stripping zone 6 below the bed level 41 therein through valved standpipe 25. The wet solid desiccant is contacted in zone 6 by upwardly flowing stripping gas, which in this particular operation is oxygen but which can be any suitable oxidizing agent such as air, ozone, an oxide of nitrogen, etc. For convenience and for better contact, the lower portion of zone 6 is baffled and the upwardly flowing stripping gas removes any of the halogen, e.g., chlorine or hydrogen halide, e.g., hydrogen chloride material entrained with the solids withdrawn from the reaction zone and returns these gases by passage through grid 7 into reaction zone 5. The stripping zone is maintained at a temperature at least as high as that maintained in the reactor, preferably at least 75° higher, e.g., in the production of chlorine, the stripping zone is maintained between about 900° F. and about 1000° F. under from about atmospheric pressure to about 150 p.s.i.g. In this particular example, a temperature of 950° F. and a pressure of about 67 p.s.i.g. was maintained in the stripping zone. The stripped solids pass downwardly to the bottom of the baffled stripping zone from which point they enter valved withdrawal standpipe 26 and are then conducted into transfer line 27.

In transfer line 27, the spent solid mixture is contacted with a mixture of fresh desiccant from line 70 and fresh catalyst from lines 72 and 70 together with a lift gas entering the transfer line from line 34. Although various materials can be employed as a lift gas in the present process in this particular embodiment, for reasons of economy, air was employed and is the preferred lift gas. The spent solid mixture in transfer line 27 is then passed upwardly by means of the lift gas and introduced into the lower portion of regeneration zone 3 above grid 16, wherein it is subjected to a temperature above that employed in the stripping zone, preferably at least 100° above the temperature in the stripping zone, for example, between about 950° F. and about 1400° F. under from about atmospheric pressure to about 150 p.s.i.g.

The temperature and the fluidization of the solids in the regeneration zone are maintained by burning a gaseous mixture within the zone and passing the effluent of the combustion reaction upwardly in the zone. For example, the regeneration zone in this particular example was maintained at a temperature of 1150° F. under 45 p.s.i.g. by the introduction and combustion of natural gas from line 74 and air from line 32 in the zone. It should be understood, however, that heat can be supplied to this zone by means other than internal combustion. For example, an external burner can be provided to supply heat to the regenerator by indirect heat exchange or any other convenient method can be employed. The solids are fluidized in the regenerator to a bed level indicated by 76. Gaseous materials pass upwardly in the regeneration zone and enter the series of separators 17 through 19 wherein solids entrained with the flue gases are separated and returned to the regeneration zone below the bed level therein. The flue gas, which in this particular instance comprises mainly water, nitrogen and carbon dioxide with minor amounts of hydrogen chloride and oxygen, is then passed through heat exchanger 78 in indirect heat exchange with incoming combustion gas entering the regenerator from compressor 80 in line 32. The flue gas is then removed from the system. A portion of the regenerated solid mixture is withdrawn from the lower portion of the regeneration zone through valved standpipe 22 from which it is passed downwardly into the lower portion of cooling zone 4 with the aid of air entering the standpipe from line 29. Another portion of the hot regenerated solid mixture is passed downwardly by means of valved standpipe 28 into the stripping zone to maintain the temperature therein by direct heat exchange with solids withdrawn from the reaction zone. The downward passage of solids in 28 is also enhanced by the introduction of air from line 30. Thus, the solid materials are circulated through the chambers of the reaction vessel primarily in a direction opposite from that of the gaseous materials.

FIGURE 2 illustrates a second embodiment of the present invention wherein the added advantages of insuring catalyst activity, longer catalyst life, and preventing the accumulation of inerts in the system, are realized. The apparatus shown in FIGURE 2 operates in a manner similar to that shown in FIGURE 1 except that regenerator 101 is a vessel separate from reaction vessel 102 and is situated at an elevation higher than vessel 102 thus allowing for external regenerated solid delivery lines 103, 104, and 105 to be operated by gravity flow and by means of valves 106, 107 and 108 respectively away from the corrosive and attritive atmosphere in the reactor. This embodiment also illustrates stripping of regenerated gases in a manner which prevents carry over of combustion gases entrained with the regenerated solids to the reaction zone. By this additional stripping step, the build-up of inert materials at the point of product removal is greatly reduced.

According to FIGURE 2, hydrogen chloride is compressed in compressor 110 and passed by means of line 112 into surge drum 114 from which the reactant gas is passed to the lower portion of the reaction vessel below the bed level 116 in reaction chamber 118. The gaseous hydrogen chloride is contacted and admixed with oxygen entering the lower portion of chamber 118 from a lower stripping zone 120 and the gaseous mixture is contacted with catalytic and desiccant material maintained in a fluidized state by the upward flow of these gases. Reaction chamber 118 is maintained at a temperature and pressure similar to that reported in the discussion of FIGURE 1. Upon contact of the hydrogen chloride with oxygen and catalyst in its upward passage through zone 18, conversion to chlorine and water takes place, however, the desiccant material in the system chemisorbs the water as soon as it is formed thus forcing the reaction to complete conversion. The gaseous effluent passes upwardly into a disengagement space 122 above the bed level where a major portion of the solids entrained with the gaseous material is returned to the bed. The gaseous effluent then continues its upward passage through grid 124 into cooling and final drying zone 126 wherein cooling coil 128 is located. Cooling zone 126 contains a separate bed of dried, solid-catalyst mixture which is maintained in a fluidized state at bed level 130 by the upward passage of gaseous reactor effluent; thus, the gaseous reactor effluent is cooled by indirect heat exchange with the cooling media in coil 128 and by direct heat exchange with the dry fluidized bed of solids in zone 126. This cooling operation causes the remaining small amounts of water which are not completely removed in the reaction zone to be chemisorbed by the desiccant material in zone 126 and also causes any catalyst which is vaporized in zone 118 to be condensed and deposited on the surface of the solids in zone 126. The gaseous materials in the cooling and drying zone pass into disengagement space 132 wherein a major portion of the solids entrained with the upflowing gases are returned to the bed in zone 126 and the gaseous materials enter cyclones 133 and 134 for completion of this operation. The gaseous product containing essentially chlorine and oxygen is then withdrawn from vessel 102 by means of line 135. This product mixture is treated as described in FIGURE 1, and a portion of this effluent mixture, rich in oxygen, is recycled to the lower portion of reaction zone 118 by means of valved line 136 in order to maintain the high partial pressure of oxygen in the reaction zone and thus maintain catalyst activity.

The solid material in zone 126 leaves a bed level 130 and are passed downwardly into valved standpipe 138 which terminates in reaction zone 118. Thus, cooled regenerated solids are passed to the reaction zone to maintain the temperature of the exothermic reaction taking place therein. As the solid materials absorb moisture they become spent and pass downwardly to the bottom of chamber 118 and into baffled stripping chamber 120. These solids in their downward passage through chamber 120 are contacted with upwardly flowing oxygen gas entering the bottom portion of stripper 120 by means of valved line 142 which serves to strip from the solids any entrained hydrogen chloride or chlorine and pass them upwardly together with the oxygen to zone 118. The stripped solids are then withdrawn downwardly from vessel 102 by means of valved line 140. From line 140 the wet solid mixture is passed to transfer line 144 wherein the solids are passed upwardly into regenerator 101 by means of a fluidizing lift gas entering transfer line 144 from line 146. The lift gas is preferably air for reasons hereinafter discussed. In regenerator 101 the spent solid mixture is contacted with gases which are caused to burn in the regenerator, thus heating the solids in order to completely drive off water and thus dry the solid material. The combustion gases enter the regenerator from valved lines 148 and 150. In this particular example air, which is pressured through line 154 and indirect heat exchanger 156 wherein the air is heated by indirect heat exchange with regenerator effluent gases. A portion of the heated air is passed through valved line 150 into the bottom portion of the regeneration zone for upward flow through grid 158 and contact with natural gas entering the lower portion of regenerator 101 by means of valved line 148. The spent solid material enters the regenerator at a point above grid 158 in an upward direction by means of line 160 and is deflected downwardly by means of cap 162 for better contact with the combustion gases, thus ensuring even temperature conditions in the zone. The solid materials are maintained in the fluidized state in the regenerator zone by means of the upward passage of gases therein to a bed level 164 above which disengagement space 166 is provided for separating a major portion of the solids entrained with the regenerator effluent gases. The gaseous regenerator effluent is then passed through cyclones 168, 169 and 170 wherein the operation of separating the gaseous mixture from solids and returning the solid materials to the fluidized system is completed. The regenerator effluent gases are then withdrawn from separator 170 in line 172 and are cooled in indirect heat exchanger 156 by indirect heat exchange with incoming combustion gas before they are vented from the system. The hot solids from chamber 101 pass downwardly into baffled stripping section 174 wherein the downwardly flowing solids are contacted with an upward current of hot air entering the bottom of the stripping section by means of valved line 176. The air in stripping section 174 passes upwardly into regenerator 101 together with any combustion gases which have been entrained with the regenerated solids. It is especially advantageous although not mandatory to employ oxygen enriched air as the stripping medium in zone 174 since the oxygen serves to insure the activity of the catalyst, a small portion of which may have become deactivated at the temperatures of regeneration. The oxygen may be introduced through valved line 178 in the desired amount.

Advantageously, another portion of the heated air in line 154 is passed to line 180 and line 146 to serve as lift gas for the solids in transfer line 144.

The regenerated solid mixture in the bottom of stripping zone 174 is withdrawn from the vessel 101 in three portions. The first portion is withdrawn downwardly in valved line 105 and passed to the mouth of standpipe 138 in cooling zone 126. Another portion is withdrawn downwardly in valved line 104 and passed to zone 126 for cooling therein. The first portion of solids passed directly to standpipe 138 is provided as a means of adjusting the temperature of solids in standpipe 138 to the desired level for maintaining a constant temperature in reaction zone 118. If desired, the first portion instead of being passed to the mouth of the standpipe can be passed directly into the reaction zone for temperature control therein. The remaining portion of regenerated solids is passed, without cooling, through valved line 103 to stripping zone 120 to maintain the temperature therein. Thus, the solid materials are contacted with reactants, stripped of gaseous product, regenerated, stripped of regenerating gas and recycled to the process. It is to be understood that many modifications and variations can be made in the above discussed drawings without departing from the scope of this invention. For example, in place of the production of chlorine, by adjusting the conditions to favor the conversion of hydrogen bromide, bromine can be produced. Also by including a hydrocarbon such as ethane and/or ethylene in the hydrogen chloride or hydrogen bromide feed, the process can be adapted to the preparation of dichloro-ethane or dibromo-ethane and/or monochloro-ethane or monobromo-ethane. In like manner, the process as discussed above including both the production of halogen and the halogenation of hydrocarbon can be applied to the production of other halogens or the halogenation of other hydrocarbons.

The following example illustrates the chlorination of ethane in the process of this invention and is not to be construed as unnecessarily limiting to the scope thereof.

*Example*

A mixture of hydrogen chloride and ethane in a mol ratio of 2:1 is passed to a reaction zone wherein the mixture is contacted with an excess of oxygen. The gaseous mixture in the reaction zone is converted to dichloroethane and water in the presence of a cupric chloride catalyst and montmorillonite desiccant mixture. The montmorillonite is present in the reaction zone in an amount of about 60 weight percent with respect to the metal of the catalyst and the solids are fluidized by the upward flow of the gaseous effluent therein at a temperature of about 485° F. at atmospheric pressure. The reactants are passed upwardly through the reaction zone into a cooling zone where the temperature and pressure are lowered to about 400° F. In the cooling zone, the gaseous effluent contacts a fresh dry mixture of catalyst and desiccant which solids are present in the same proportion as that existing in the reaction zone. Upon passing through the cooling zone, the remaining trace quantities of water are absorbed from the effluent mixture and vaporized catalyst (less than about 1 percent) is condensed and deposited on the surface of the solids. The gaseous mixture is then passed through a cyclone separator and withdrawn from the cooling zone. This product effluent, which contains dichloroethane in about 90 percent yield and oxygen is then compressed and cooled to liquify the dichloroethane product, the oxygen portion of the mixture being recycled to the reaction zone to maintain the oxygen partial pressure therein.

The solid mixture in the cooling zone is withdrawn downwardly and passed to the reaction zone to maintain the temperature therein and to supply fresh regenerated solids thereto. The solids pass downwardly in the reaction zone while absorbing water generated by the reaction, up to about 2 percent by weight of the desiccant, after which the solids pass downwardly through a baffled stripping zone wherein they are contacted with oxygen gas for the removal of any entrained halogenated material. The stripped solids are then withdrawn from the stripping section and passed to a regenerator where they are heated to completely remove water and restored to their original absorbing capacity. The dried solid mixture is then returned to the cooling zone wherein the temperature is reduced to 400° F. before recycle to the reaction zone. Thus, the above chlorination process is carried out in a continuous manner with a maximum of efficiency and with high yield of product (about 90 percent). However, it is to be understood that, if desired, the above process can be carried out in a batch operation without departing from the scope of this invention.

It is also to be understood that other hydrocarbon materials can be substituted in the above example to replace ethane, for example propylene, methyl acetylene, ethylene, methane, butane, butadiene; and that other halogenating agents such as, for example hydrogen bromide, hydrogen iodide can be employed to produce high yields of the corresponding halogenated products. Other catalysts such as aluminum chloride, copper silicate, ferric oxide and ferric chloride can be substituted in the above example for the cupric chloride employed as these catalysts are particularly well suited to the halogenation of hydrocarbons.

Having thus described our invention, we claim:

1. A process for the production of halogen which comprises the steps in combination: catalytically reacting an inorganic halide with a compound containing oxygen in a reaction zone at elevated temperature in the presence of a desiccant to effect the formation of halogen and water; fluidizing the desiccant during the reaction and absorbing the water in the desiccant as it is formed; passing the desiccant contacted product effluent to a cooling zone containing a separate bed of desiccant; separating the resulting reaction product effluent from the desiccant in the cooling zone and recovering the cooled, dry product containing halogen as the product of the process.

2. A process for the production of halogen which comprises the steps in combination: catalytically reacting an inorganic halide with a compound containing oxygen in a reaction zone at elevated temperature in the presence of a fluidized desiccant to effect the formation of halogen and water; absorbing the water in the desiccant as it is formed; passing the desiccant contacted reaction product effluent to a cooling zone containing a separate bed of desiccant; removing wet desiccant from the reaction zone; passing said wet desiccant through a stripping zone in contact with stripping gas to remove halogen-containing compound entrained with the desiccant; drying the stripped desiccant in a regeneration zone at elevated temperature to restore its water absorption capacity; adjusting the temperature of the regenerated desiccant to below the reaction temperature in the reaction zone and returning desiccant to the reaction zone; and recovering the cooled, dry reaction product which is a halogen containing compound from the cooling zone.

3. A process for the production of halogen which comprises the steps in combination: catalytically reacting an inorganic halide with a compound containing oxygen in a reaction zone at elevated temperature in the presence of a fluidized desiccant to effect the exothermic formation of halogen and water; absorbing the water in the desiccant as it is formed; passing the desiccant contacted reaction product effluent to a cooling zone containing a second, separate bed of fluidized desiccant; cooling and absorbing additional quantities of water from the reaction product effluent in said cooling zone; removing wet desiccant from the reaction zone; passing said wet desiccant through a stripping zone in contact with stripping gas to remove halogen-containing compound entrained with the desiccant; drying the stripped desiccant in a regeneration zone at elevated temperature to restore its water absorption capacity by direct heat exchange obtained by the combustion of gases which are inert to the reaction of the process; passing the regenerated desiccant in contact with stripping gas through a second stripping zone to remove any of the combustion gases entrained with the desiccant; returning regenerated and stripped desiccant to the reaction zone after adjusting the temperature of the desiccant to below that of the reaction; and recovering the cooled, dry reaction product which is a halogen-containing compound from the cooling zone.

4. The process of claim 3 wherein the regenerated, stripped desiccant is cooled in the cooling zone before returning to the reaction zone to control the temperature in the reaction zone.

5. A process for the exothermic production of halogen which comprises the steps in combination: reacting an inorganic halide with a compound containing oxygen in a reaction zone at an elevated temperature in the presence of a solid desiccant-catalyst mixture to effect the formation of halogen and water; fluidizing the solid mixture during the reaction to provide better contact with the reactants; absorbing water in the desiccant as soon as it is formed in the reaction zone; passing the desiccant contacted reaction product effluent into a cooling zone containing a separate fluidized bed of desiccant and catalyst; condensing additional quantities of water from the reaction product effluent at a lower temperature and absorbing said water in the fluidized solids in said cooling zone; separating the solid desiccant-catalyst mixture from the resulting reaction product effluent; passing the desiccant-catalyst mixture from the cooling zone into the reaction zone to maintain a constant temperature therein and recovering a dry halogen-containing product from said cooling zone.

6. The process of claim 5 wherein the halide reactant is hydrogen bromide and the halogen-containing product is bromine.

7. The process of claim 5 wherein the halide reactant is hydrogen chloride and the halogen-containing product is chlorine.

8. A process for the exothermic production of halogen which comprises the steps in combination: reacting an inorganic gaseous halide with a gaseous oxidizing compound containing oxygen in a reaction zone at an elevated temperature in the presence of a solid desiccant-catalyst mixture to produce halogen and water; fluidizing the solid mixture during the reaction to provide better contact with the gaseous reactant materials; absorbing water in the desiccant as it is formed in the reaction zone; passing the desiccant contacted gaseous reactor effluent into a separate cooling zone containing a separate bed of fluidized desiccant-catalyst solids; condensing additional quantities of water from said gaseous reactor effluent and absorbing the condensed water in the fluidized desiccant in said cooling zone; separating solids from the resulting dry reactor effluent and recovering cooled, dry halogen containing compound from the cooling zone; withdrawing solids from said cooling zone and delivering them to said reaction zone; withdrawing wet solids from said reaction zone and introducing them into a stripping zone in countercurrent contact with stripping gas at a temperature above the reaction temperature to remove any halogen-containing gas entrained with the solids; passing the resulting stripping gas mixture into the reaction zone; withdrawing the stripped solids from said stripping zone and passing them to a regeneration zone maintained at a higher temperature than the temperature in the stripping zone; drying the solids to restore their water absorption capacity in said regeneration zone; and returning at least a portion of the regenerated solids to the reaction zone at a temperature below the reaction temperature to maintain constant temperature conditions in the reaction zone.

9. The process of claim 8 wherein the regenerated solids are divided into two portions and wherein one portion is returned to the reaction zone after passing through the cooling zone and the other portion is returned to the stripping zone to maintain a constant temperaure in the stripping zone above the reaction temperature.

10. The process of claim 8 wherein the stripping gas and the reactant containing oxygen is molecular oxygen; the halide reactant is hydrogen chloride and the halogen-containing product is chlorine.

11. The process of claim 8 wherein the catalyst is chromium sesquioxide and the desiccant is bentonite.

12. A continuous process for the exothermic production of halogen which comprises the steps in combination: reacting a hydrogen halide with a molar excess of oxygen in a reaction zone at a temperature between about 600° F. and about 900° F. in the presence of a solid bentonite catalyst mixture to produce halogen and water; fluidizing the solid mixture during the reaction to provide better contact with the gaseous reactant materials; absorbing water in the bentonite as it is formed in the reaction zone; passing the gaseous reactor effluent into a cooling zone maintained at a temperature below the reaction temperature, between about 300° F. and about 800° F. and containing a second separate bed of fluidized bentonite catalyst solids; condensing additional quantities of water from said gaseous reactor effluent at the lower temperature and absorbing the water in the fluidized bentonite in said cooling zone; separating solids from the resulting dry reactor effluent and recovering cooled, dry halogen from the reactor effluent in the cooling zone; withdrawing solids from said cooling zone and delivering them to said reaction zone to maintain a constant temperature therein; withdrawing solids having a water content of not more than about 2 percent water based on the bentonite and introducing said solids into a stripping zone maintained at a temperature above the reaction temperature, between about 700° F. and about 1000° F., in countercurrent contact with gaseous oxygen to remove any halogen entrained with the solids; passing the resulting oxygen-halogen gaseous mixture into the reaction zone; withdrawing the stripped solids from said stripping zone and passing them to a regenerated zone maintained at a temperature of between about 950° F. and about 1400° F. by direct heat exchange with the combustion of gases therein; drying the solids to restore the water absorption capacity of the bentonite in said regeneration zone; and withdrawing and stripping regenerated solids to remove any combustion gases entrained therewith; passing a portion of the regenerated stripped solids to the cooling zone and passing a second portion of the regenerated stripped solids to the first stripping zone to maintain a constant temperature therein above the temperature in the reaction zone.

References Cited in the file of this patent

UNITED STATES PATENTS

| | | |
|---|---|---|
| 2,341,193 | Scheineman | Feb. 8, 1944 |
| 2,602,021 | Belchetz | July 1, 1952 |
| 2,746,844 | Johnson et al. | May 22, 1956 |
| 2,812,244 | Roetheli | Nov. 5, 1957 |
| 2,951,878 | Neureiter | Sept. 6, 1960 |
| 2,990,429 | Sleddon | June 27, 1961 |

UNITED STATES PATENT OFFICE
CERTIFICATE OF CORRECTION

Patent No. 3,159,455                          December 1, 1964

George T. Skaperdas et al.

It is hereby certified that error appears in the above numbered patent requiring correction and that the said Letters Patent should read as corrected below.

In the grant, lines 3 and 4, and in the heading to the printed specification, lines 7 and 8, for "assignors, by mesne assigments, to Pullman Incorporated, a corporation of Delaware", each occurrence, read -- assignors to Pullman Incorporated, a corporation of Delaware --.

Signed and sealed this 7th day of June 1966.

(SEAL)
Attest:

ERNEST W. SWIDER                          EDWARD J. BRENNER
Attesting Officer                              Commissioner of Patents